April 21, 1964 J. R. BUOTTE ETAL 3,130,277

ORDER WIRE AND ALARM CIRCUITS

Filed Dec. 29, 1960 3 Sheets-Sheet 1

INVENTORS: J. R. BUOTTE
J. A. WORD
BY [signature]
ATTORNEY

INVENTORS: J. R. BUOTTE
J. A. WORD
BY [signature]
ATTORNEY

INVENTORS: J. R. BUOTTE
J. A. WORD
BY [signature]
ATTORNEY

United States Patent Office 3,130,277
Patented Apr. 21, 1964

3,130,277

ORDER WIRE AND ALARM CIRCUITS

Joseph R. Buotte, Lawrence, and John A. Word, Andover, Mass., assignors to Bell Telephone Laboratories, Incorporated, New York, N.Y., a corporation of New York Filed Dec. 29, 1960, Ser. No. 79,343
4 Claims. (Cl. 179—179.31)

This invention relates to alarm circuits for radio communication systems and more particularly to simplified alarm circuits for use in low cost, light route radio relay systems.

In any communication system utilizing unattended repeater stations and requiring a high degree of service reliability, it is necessary to have some way to monitor the performance of the unattended stations so that failures and service interruptions can be detected. It is, of course, further desirable to place the unattended repeater stations along easily accessible routes, such as public highways, so that any failed station may be readily maintained.

When the unattended repeaters are placed along such routes, there is generally available along the same routes commercial alternating-current power. Therefore, in the interest of economy, it is advantageous to utilize this commercial power as a primary source at the unattended repeaters. However, in the event of an alternating-current power failure and because of the high degree of reliability required, it becomes necessary to provide a substitute power supply capable of maintaining service sufficiently long to permit corrective action to be taken. It is thus necessary to provide an alarm circuit in the system whereby a person at an attended station will be informed of any such power failures so that steps may be taken to maintain the system for any duration of primary power failure.

The use of the communication system will determine the degree of reliability, the availability of commercial or a similar power source and the complexity of the system. For example, in a communication system such as the one disclosed by M. B. McDavitt in the American Institute of Electrical Engineers' Transactions, vol. 76, Part 1, starting at page 715, many of the unattended repeater stations are located in isolated areas where there is no commercial power available. Therefore, in such a communication system, it is necessary to provide at each unattended repeater station a primary power source which will function for a long period of time and can be maintained by periodic inspections.

However, when a communication system employs commercial power as the primary source, possible failure of such power makes necessary the provision of an emergency source. Such a source usually comprises batteries of limited capacity which are automatically placed in use upon interruption of the primary source. Obviously, substitution of the emergency source makes the system good, though for a limited time only and the alarm system must, without substantial increase in complexity, indicate that such substitution has occurred at an identified location.

It is accordingly the object of the present invention to provide an alarm circuit which is consistent with the economic requirements of a low cost communication system, yet is adequate to account for system failures, substitution of the emergency power supply and possibly other selected failures.

In accordance with the invention, therefore, in a communication system that appears normal upon the substitution of a power supply having a short life for a failed power supply having an undetermined life at a subsidiary or repeater station, means are provided for informing the operator at the main station of the power failure so that corrective action may be taken. Basically, such means comprise an alarm signaling channel forming a loop which links all of the stations, transmitting means at the main station for impressing a first signal to the loop, means at the main station for receiving this first signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for the signal individual to that station, and means at each subsidiary station responsive to primary power failure and possibly other selected failures for periodically interrupting the path through the bridging means.

These and other features and advantages of the present invention will appear more clearly and fully upon consideration of the following specification taken in connection with the drawing in which.

Figure 1:
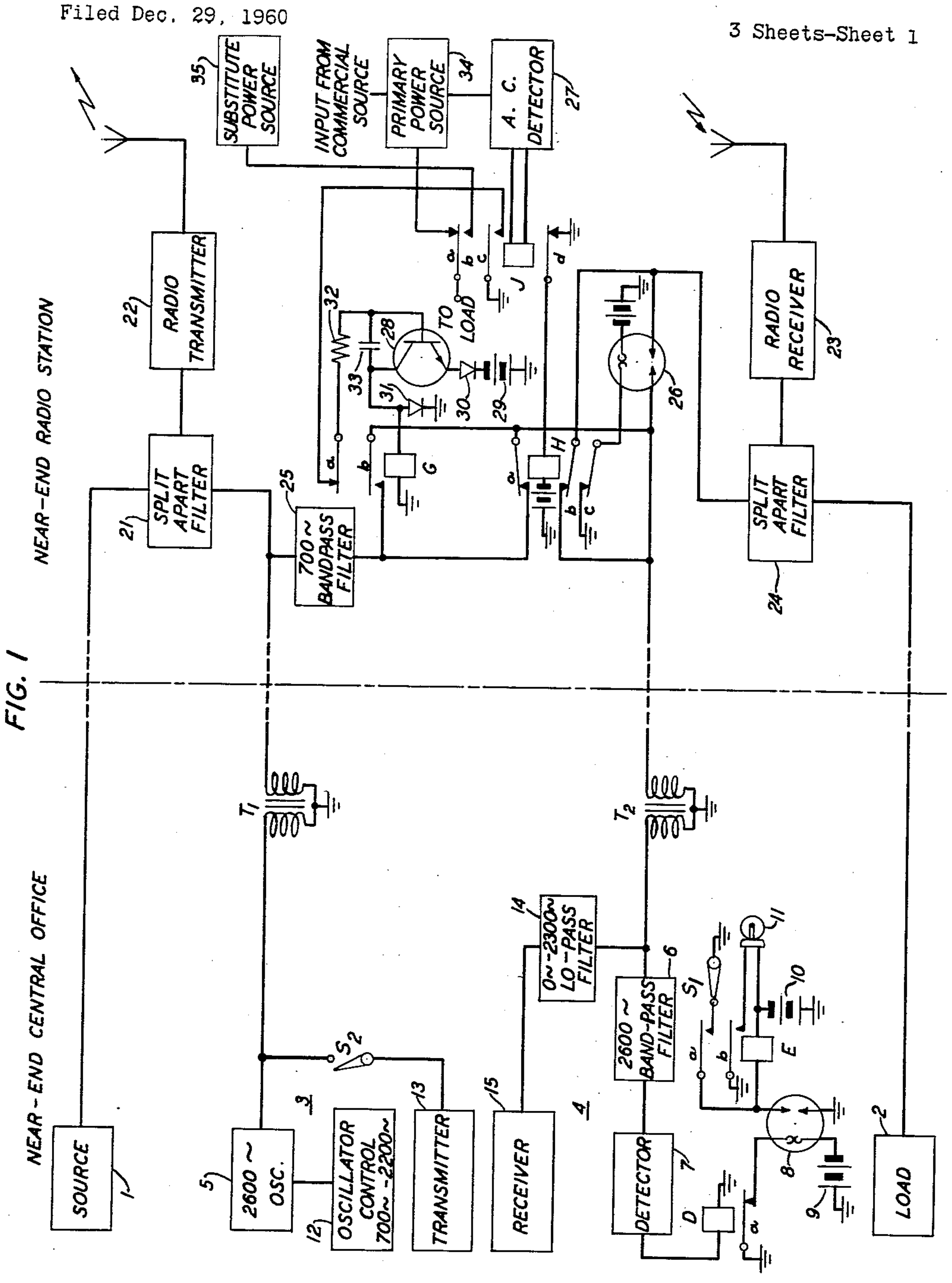
FIG. 1 is a diagram, partially in block form, illustrating the equipment provided, according to the invention, at an attended central office and a first radio station.
Figure 2:
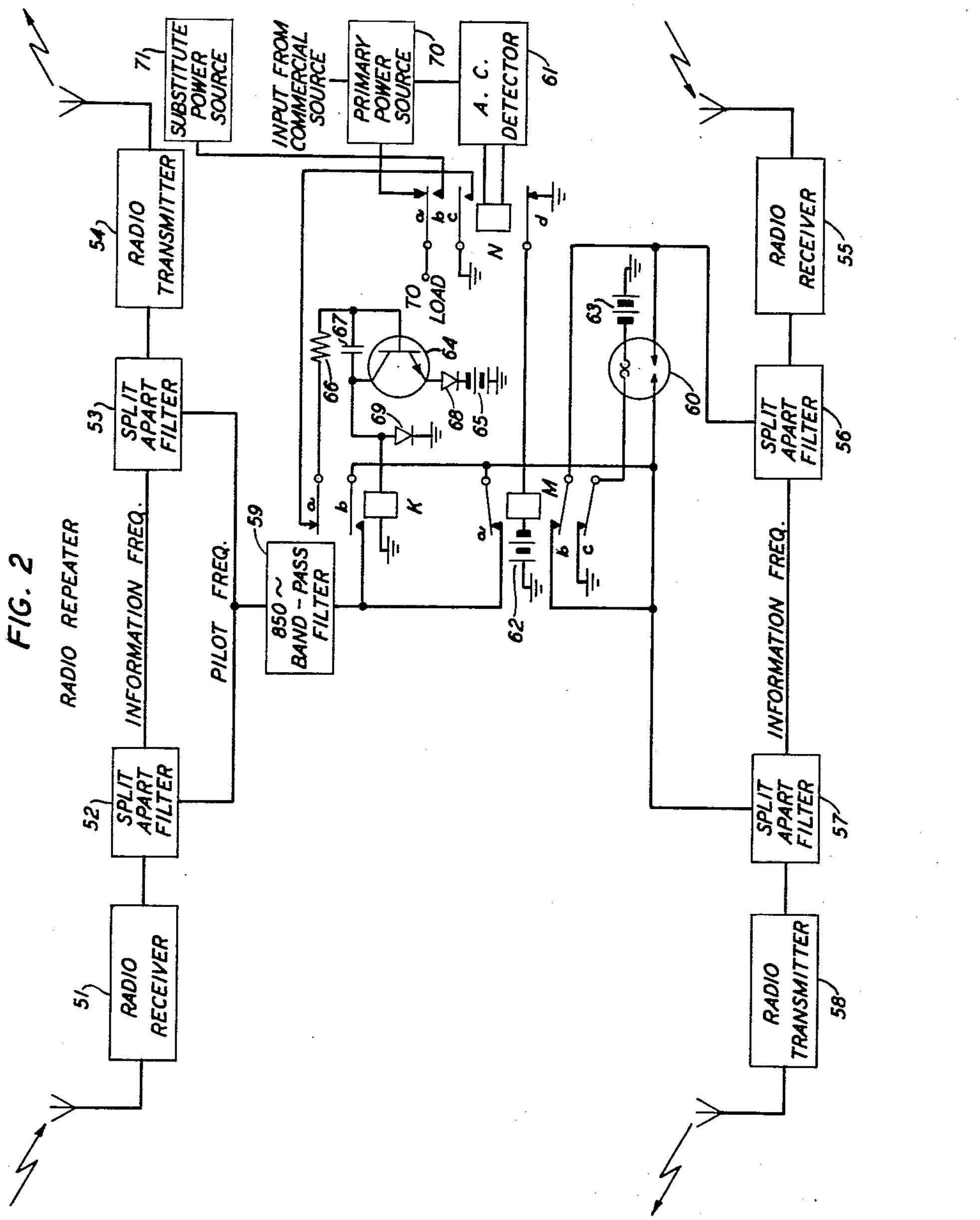
FIG. 2 is a diagram, partially in block form, illustrating the equipment provided, according to the invention, at a typical repeater station.
Figure 3:
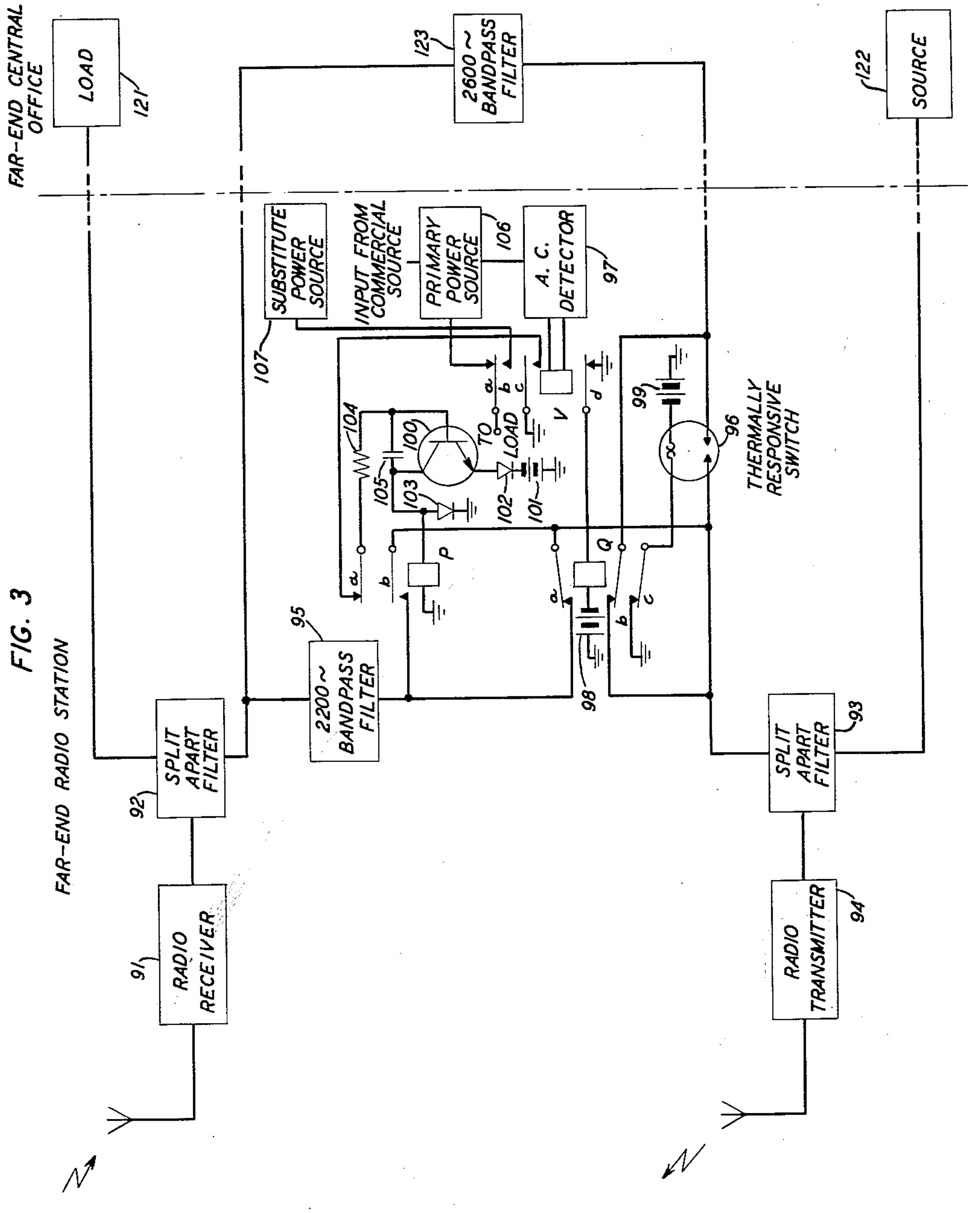
FIG. 3 is a diagram, partially in block form, illustrating the equipment provided, according to the invention, at a terminating radio station and a terminating central office.

FIGS. 1, 2 and 3, taken together in the order given, illustrate a typical communication system employing unattended subsidiary stations and embodying the alarm circuit, in accordance with the present invention. The communication system shown comprises a near-end central office, a near-end radio station, a radio repeater, a far-end radio station and a far-end central office. The circuits of this typical communication system and its alarm circuit are shown for the condition of normal operation where the main station and all subsidiary stations are functioning properly.

The information transmitted from the near-end central office to the far-end office is supplied by information source 1. This information modulates a high-frequency carrier signal and is carried along a wire line to the near-end radio station, where it passes through a split-apart filter 21 and is thereafter amplified by and radiated from radio transmitter 22 at the same or a higher frequency. The split-apart filter may be, for example, a hybrid network or a combination of band-pass filters having a frequency bandpass sufficiently broad to accept the lowest signaling frequency and the highest frequency of the information-carrying signals. The signal transmitted from the near-end radio transmitter is received by a radio receiver 51 in the radio repeater (FIG. 2). The information-carrying signal passes through split-apart filters 52 and 53 and is reradiated, after being amplified by radio transmitter 54. After the signal passes through any succeeding radio repeaters of the system, it is finally received by radio receiver 91 of the far-end radio station (FIG. 3). The information-carrying signal is then passed through split-apart filter 92 to the point of utilization in the far-end central office shown generally as information load 121.

The signals originating at the far-end central office traverse a similar path between the far-end central office and the near-end central office. The information signal originating at the far-end central office is supplied by information source 122 and is carried by a wire line to the adjacent radio station where it passes through split-apart filter 93 to radio transmitter 94, where it is amplified and radiated to the adjacent radio repeater. After the signal is passed through any intervening radio repeaters, it is received by the radio receiver 55 (FIG. 2) of the radio repeater adjacent the near-end radio station. The information-carrying signal originating at the far-end central office is then passed through split-apart filters 56 and 57 to radio transmitter 58, where it is amplified and reradiated from the radio repeater. The signal is thereafter received at the near-end radio station by radio receiver 23, where it is amplified and passed through split-apart filter 24 and carried by wire line to the utilization point in the near-end central office represented generally by information load 2.

The alarm circuit provided in the communication system comprises a signaling loop which links all of the stations including the near-end radio station, the plurality of radio repeaters, the far-end radio station and the far-end central office. This signaling loop will be herein described as having normally impressed thereon a signal frequency of approximately 2600 cycles-per-second, with provisions for applying individually to the signaling loop signals having frequencies between 700 and 2200 cycles-per-second. These signals or pilot tones originate at the near-end central office and are supplied by pilot tone source 3. These pilot tones are carried by wire line through transformer $T_1$ to the near-end radio station where they are combined in the split-apart filter 21 with the information-carrying signal. The combined signal is then applied to radio transmitter 22 from which it is transmitted to the radio receiver 51 of the adjacent radio repeater. The pilot tones are separated from the information-carrying signal by split-apart filter 52 and traverse a path, separate from the path traversed by the information-carrying signal, to the split-apart filter 53. The tone signals and the information signal are recombined in split-apart filter 53 and are passed on to radio transmitter 54, where they are reradiated to the succeeding radio repeaters. The combined signal is received by radio receiver 91 at the far-end radio station and applied to split-apart filter 92, wherein the information-carrying signal and pilot tones are separated so that the information-carrying signal is carried by wire line to the information load 121 and the pilot tones are carried by wire line to band-pass filter 123 in the far-end central office.. Band-pass filter 123 completes the loop so that the 2600-cycle pilot tone may be returned to the near-end central office. It may be desirable for purposes of economy to complete the loop through the far-end radio station rather than the far-end central office. The 2600 cycles-per-second band-pass filter 123 would then be located at the far-end radio station.

As shown in FIG. 3, the return path of the pilot tone from the far-end central office to the near-end central office is through contact *b* of a relay Q, or the parallel path through a thermally responsive switch 96, depending upon the continuity of these paths, to the split-apart filter 93, where it is combined with the information-carrying signal from source 122. The combined signal is thereafter amplified and radiated from the radio station by radio transmitter 94. The combined signal passes through the plurality of radio repeaters and is thereafter reecived by radio receiver 55 in the radio repeater adjacent the near-end radio station. The pilot tone is separated from the information-carrying signal by split-apart filter 56 and traverses a path, different from the path traversed by the information-carrying signal, to split-apart filter 57. The pilot tone passes through contact *b* of a relay M or the parallel path of a thermally responsive switch 60, depending upon which path is available, in traveling between split-apart filters 56 and 57. The pilot tone recombines with the information-carrying signal in split-apart filter 57 and is thereafter amplified and radiated by radio transmitter 58.

The combined signal is thereafter received by radio receiver 23 in the near-end radio station and is passed on to split-apart filter 24. The pilot tone is herein separated from the information-carrying signal and is carried by a wire line through either contact *b* of a relay H or the contacts of a thermally responsive switch 26 to the alarm circuit 4 in the near-end central office. The alarm circuit 4 is coupled to the near-end radio station through transformer $T_2$.

The 2600-cycle tone, which is normally applied to the signaling channel, will, upon entering the alarm circuit 4, pass through a band-pass filter 6 to a detector 7. When the 2600-cycle tone is present in detector 7, relay D, connected to the output of the detector, will be inactive and its contact *a* will be in the position shown in FIG. 1. When contact *a* of relay D is closed, as shown, there is a direct-current path through a thermally sensitive switch 8 for the current from a battery 9. With this direct current flowing through the thermally sensitive switch 8, its contacts will be open as shown. Therefore, a relay E, in series with the switch, will be inactive because of the absence of a conduction path for current therethrough. There is, however, another conduction path for relay E through its contact *a*, which will be open until relay E is activated by the closing of the conduction path through thermally sensitive switch 8. The closing of contact *a* of relay E provides a locking circuit which will hold the alarm indication until released by the opening of switch $S_1$. The thermally sensitive switch 8, which provides a delay in the activation of the alarm to avoid false alarms, may be removed by connecting relay E directly to contact *a* of relay D and having relay E active during the presence of the 2600-cycle tone.

It is noted that the loop of the signaling channel has the 2600-cycle tone passing through relay contacts at each subsidiary station so that, in the event of a failure at any subsidiary station, the transmission path of the 2600-cycle tone will be opened to effect an alarm in the alarm circuit 4. For example, if relay H of the near-end radio station were to become desensitized, contact *b* of this relay would open, thereby opening the tone signal path in the loop of the signaling channel. When the pilot tone path is opened, the 2600-cycle tone no longer apperas at the input to detector 7, which causes relay D to become activated. When relay D is activated, its contact *a* opens, thus opening the conduction path through the thermally sensitive switch 8. After a selected period of time, the contacts of thermally sensitive switch 8 close, providing a conduction path through relay E from a source 10. Relay E thereby becomes activated, closing its contacts *a* and *b*. The closing of contact *b* completes the circuit from source 10 through a lamp 11, thereby effecting a visual alarm. An additional contact may be added to relay E so that an audible alarm may also be activated.

Assuming, for the purposes of illustration, that primary power source 70 in the adjacent radio repeater shown in FIG. 2 becomes inoperative because of lighting or some other similar effect, the following events will take place in the alarm circuit of the communication system. It will be recalled that under normal conditions, the 2600-cycle tone originating from source 5 at the near-end central office traverses the signaling channel loop and is received in the alarm circuit 4 to indicate that all stations are functioning properly. When primary power source 70, which is supplied by a commercial source at the radio repeater, fails, alternating-current detector 61, which is monitoring the primary power source, has an output which activates relay N, thereby closing its contacts *b* and *c* and opening its contacts *a* and *d*. The closing of contact *b* of relay N will effect the substitution of substitute power source 71 for primary source 70 to supply the power requirements of the radio repeater. When contact *d* of relay N is opened, the conduction path of relay M from battery 62 is opened, thereby deactivating relay M. The deactivation of relay M causes its contacts *a*, *b* and *c* to open. When contact *b* of relay M opens, the pilot tone path is opened so that the 2600-cycle tone will be interrupted to effect an alarm in the near-end central office.

When the alarm is activated by the removal of the 2600-cycle tone, the operator at the near-end central office is apprised of the failure at one of the stations by the lighting of the lamp 11 as above described. This failure may be either the failure of a primary power source at one of the subsidiary stations, or it may be a failure in the transmission equipment, for example, one of the radio transmitters or radio receivers at one of the subsidiary stations of the communication system. Since provision is made at each subsidiary station for substituting an emergency power source upon failure of the commercial power supply at that station, for example, contacts *a* and *b* of relay N (FIG. 2) in the radio repeater, such failure will, at the outset at least, produce only a momentary interruption, if any, in service. It is necessary, therefore, to provide an alarm indication at the attended station which will alert the attendant that a trouble exists and to do this without disabling the alarm circuit for subsequent action if a failure of the transmission equipment should occur.

A means for providing an appropriate interruption in the 2600-cycle tone path to indicate a primary power soure failure is typically shown in the radio repeater of FIG. 2 as comprising a thermally sensitive switch 60 in conjunction with contacts *b* and *c* of relay M. When the failure of the primary power source at the radio repeater of FIG. 2 is detected by alternating-current detector 61, contact *d* of relay N will open causing the deactivation of relay M, thereby opening all of its contacts. When contact *c* of relay M opens, the conduction path through the control electrodes of thermally sensitive switch 60 from battery 63 will open and after a selected period of time the contacts of thermally sensitive switch 60 will close, thereby reinstating the transmission path of the 2600-cycle tone so that it may be used to signal failures of other types. It is seen that the interruption in the pilot tone path is only momentary and of a duration determined by thermally sensitive switch 60. Because of the locking circuit provided for relay E (FIG. 1), however, the alarm indication will be maintained at the near-end station.

When the operator at the near-end central office becomes aware of the alarm either by visual or audible means, he will immediately take steps to determine whether the alarm is caused by a transmission equipment failure, by a primary power source failure or some other selected failure at one of the subsidiary stations. In order to determine which has occurred, the operator may open switch $S_1$ (FIG. 1) which will remove one conduction path (the locking path) through relay E; and, if the 2600-cycle tone is again present in the detector 7, it will have energized thermally sensitive switch 8 so that the other conduction path for relay E will also be open. Therefore, if both conduction paths of relay E are open, the relay will become de-energized allowing contacts *a* and *b* to open. When contact *b* of relay E opens, the conduction path through the visual alarm device 11 will open, thereby removing this alarm. The removal of this alarm indicates to the operator that the pilot tone path was only momentarily interrupted, thereby indicating a primary power source failure or some other selected failure. The operator may next take steps to determine the location and type of failure so that correct action may be taken. He does so by removing the 2600-cycle output of source 5 and substituting therefor, one at a time, signals having different frequencies, each frequency being associated with one particular subsidiary station. The 2600-cycle tone is removed, for example, by changing the tuning of the oscillator 5 by adjusting oscillator control 12. Assuming that the first tone substituted for the 2600-cycle tone has a frequency of 700 cycles, it will traverse the signaling channel until it arrives at the particular subsidiary station, which will accept this 700-cycle tone. Similarly, the other selected tones having unique frequencies will traverse the signaling channel until they arrive at their particular subsidiary station which will bridge this tone from one transmission direction to the other so that the tone will return to the near-end central office.

Assuming that the frequency of the tone associated with the radio repeater of FIG. 2 is 850 cycles and that this tone is impressed upon the signaling channel, it will appear at the input to band-pass filter 59. Band-pass filter 59 is responsive to the 850-cycle tone and will therefore pass this tone into the bridging circuit. Let it be assumed, that the primary power source for this radio repeater has failed and such failure has been detected by alternating-current detector 61, relay M is de-energized and the 850-cycle tone path through contact *a* of relay M will be open. However, the activation of relay N by the alternating-current detector 61 will close contact *c* so that transistor 64 will begin to conduct, allowing current to flow from ground reference through relay K, the collector-emitter path of transistor 64, and diode 68 to the negative terminal of battery 65. This current flow will activate relay K, closing its contact *b* so that there will be a current path for the 850-cycle tone through the bridging circuit allowing it to return to the near-end central office. When relay K is activated, its contact *a* will open so that the current will no longer flow through the transistor 64 and the relay K will thereby be de-energized. However, as soon as relay K is de-energized, its contact *a* will again close and its contact *b* will open. When contact *a* closes, transistor 64 will again be allowed to conduct. This conduction of transistor 64 will again activate relay K thereby again closing its contact *b* so that the 850 cycle tone path is again closed. The transistor's periods of conduction and nonconduction will be determined by the time constant of the combination of resistor 66 and capacitor 67. It is seen, therefore, that the 850 cycle tone received back at the near-end central office will not be a continuous tone but will be pulsating, indicating to the operator at the near-end central office that the subsidiary station associated with the 850 cycle tone has had a primary power source failure.

If there has not been a primary power source failure at a subsidiary station, the tone associated with that station will be received back at the near-end central office in a continuous rather than a periodic manner. Assume that it has been determined that there is a primary power failure at the radio repeater of FIG. 2, as abovedescribed, the operator at the near-end central office will continue to selectively impress tones of different frequencies upon the signaling channel to determine whether or not there has been a failure at any other subsidiary station. If the far-end radio station has a tone frequency of 2200 cycles and has not had any failures, it will accept the 2200 cycle tone. Bandpass filter 95, which is tuned to 2200 cycles, will pass this tone. The tone will have a path through the bridging circuit through contact *a* of relay Q to the transmission path of the opposite direction where it will return to the near-end central office. When a 2200 cycle tone is received at the near-end central office, it will be continuous indicating that there has not been a primary power source failure at the far-end radio station.

The means for momentarily interrupting the 2600 cycle tone path at the rear-end radio station when a primary power source failure occurs at that station comprises alternating current detector 27, contact *d* of relay J, contacts *b* and *c* of relay H and thermally sensitive switch 26. Similarly, for the far-end radio station, the means for momentarily interrupting the 2600 cycle tone path when there is a primary power source failure comprises alternating current detector 97, contact *d* of relay V, contacts *b* and *c* of relay Q and thermally sensitive switch 96. The power source for relay Q is a battery 98 and the power source for thermally sensitive switch 96 is a battery 99.

It is further noted that the means for periodically interrupting the tone signal path in the near-end radio station comprises contacts *a* and *b* of relay G, transistor 28 and its bias source 29 supplied through diode 30, inductive surge protective diode 31 and a conduction period determining circuit comprising resistor 32 and capacitor 33. Similarly, the means for periodically interrupting the tone signaling path in the far-end radio station comprises contacts *a* and *b* of relay P, transistor 100 and its bias source 101 supplied through diode 102, inductive surge protective diode 103 and the conduction period determining circuit comprising resistor 104 and capacitor 105.

Additional means may be included at each subsidiary station to be used in conjunction with or separately from the means for indicating primary power source failure. For example, the antennas for the radio system may be located on towers which require lights. Means may then be provided which may code the tone associated with the particular subsidiary station in a manner different from that caused by a primary power source failure so that an operator may be informed of any such tower light failure.

It is further possible that a second transmission path may be provided between stations for diversity operation. Whenever there is diversity operation, it is desirable that an operator be informed. This may be accomplished in a fashion similar to the alarm provision for tower lights by modifying the basic alarm circuit disclosed above.

It is also sometimes desirable to be able to communicate from any subsidiary station to the near-end central office. Under this condition, the bridging circuit at the subsidiary station may be replaced by a suitable filtering circuit in conjunction with a transmitter and receiver. Therefore, if a person at a subsidiary station desires to talk to the operator at the near-end central office, he may momentarily interrupt the 2600 cycle tone path, thereby providing an indication at the near-end central office that there has been either a failure or that someone has signaled. The operator may thereafter connect transmitter 13 to the primary of transformer $T_1$ through switch $S_2$ and ask if anyone has signaled. The person who has signaled in may thereafter communicate with the operator through low-pass filter 14 and receiver 15. Receiver 15 is the same receiver in which the operator will receive the tone signals associated with the subsidary stations to determine whether or not there has been a failure.

What is claimed is:

1. In a communication system comprising a main station and a plurality of subsidiary stations, an alarm signaling channel forming a loop linking all of said stations, transmitting means at said main station for impressing a first signal to said loop, means at said main station for receiving said signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for only the signal individual to that station in the absence of specified trouble conditions at that station, and means at each subsidiary station for periodically interrupting said loop bridging means at the corresponding subsidiary station in the event of a trouble condition of other than said specified trouble conditions.

2. In a communication system comprising a main station, a plurality of subsidiary stations and a terminating station, an alarm signaling channel forming a loop linking all of said stations, transmitting means at said main station for impressing a first signal to said loop, a commerical alternating-current power source, means for connecting said power source as the primary power source at each subsidiary station, means responsive to said primary source for momentarily interrupting said signaling channel loop at each subsidiary station, additional means at said main station for selectively applying to said loop signals having different frequencies individual to said subsidiary stations, means at each subsidiary station bridging said loop for only the signal individual to that station, and means at each subsidiary station responsive to said primary source for periodically interrupting said bridging means path in the event of the failure of said primary power source.

3. In a communication system comprising a main station and a plurality of subsidiary stations, an alarm signaling channel forming a loop linking all of said stations, a first signal source having a frequency $f$ located at said main station, means for normally applying said first signal to said signaling channel, means at said main station for receiving said first signal over said loop, a primary power source at each subsidiary station, a first path at each subsidiary station for the return of said first signal to said main station, a second path parallel to said first path at each subsidiary station for the return of said first signal to said main station, means at each subsidiary station for opening said first path in response to the failure of said primary power source, means at each subsidiary station for closing said second path after a predetermined period of time, additional means at said main station for selectively applying to said loop signals having frequencies between $f_2$ and $f_3$, each of said signals being individually associated with one of said subsidiary stations, means at each subsidiary station for selectively accepting one of said signals, a first path at each subsidiary station normally closed for conducting said one of said signals from said accepting means to the return path of said signaling channel, a second path normally open at each subsidiary station for conducting said one of said signals from said accepting means to the return path of said signaling channel, and means at each subsidiary station for opening said first path in response to the failure of said primary power source and for periodically closing said second path.

4. In a communication system comprising a main station and a plurality of subsidiary stations, an alarm signaling channel forming a loop linking all of said stations, transmitting means at said main station for impressing a first signal to said loop, means at said main station for receiving said signal over said loop, means at each subsidiary station for interrupting said loop in the event of trouble at the respective station, additional means at said main station for selectively applying to said loop signals being individually coded to said subsidiary stations, means at each subsidiary station bridging said loop for only the signal individual to that station in the absence of specified trouble conditions at that station, and means for periodically interrupting said loop bridging means at the corresponding subsidiary station in the event of a trouble condition of other than said specified trouble conditions.

References Cited in the file of this patent

UNITED STATES PATENTS

| | | |
|---|---|---|
| 2,315,434 | Leibe | Mar. 30, 1943 |
| 2,315,435 | Leibe | Mar. 30, 1943 |
| 2,580,097 | Ilgenfritz et al. | Dec. 25, 1951 |
| 2,581,056 | Walmsley et al. | Jan. 1, 1952 |
| 2,892,895 | Abbott | June 30, 1959 |

FOREIGN PATENTS

| | | |
|---|---|---|
| 734,721 | Great Britain | Aug. 3, 1955 |